United States Patent [19]

Sandhu

[11] Patent Number: 4,652,086
[45] Date of Patent: Mar. 24, 1987

[54] ULTRASONIC DETECTOR CELL AND SYSTEM

[75] Inventor: Jaswinder S. Sandhu, Chicago, Ill.

[73] Assignee: Raj Technology, Inc., Chicago, Ill.

[21] Appl. No.: 565,231

[22] Filed: Dec. 27, 1983

[51] Int. Cl.$^4$ ............................ G02F 1/13; G02F 1/11
[52] U.S. Cl. ........................................ 350/330; 350/371
[58] Field of Search ............... 350/330, 358, 371, 398; 73/603; 340/112, 784; 358/235; 367/7, 11; 315/55

[56] References Cited

U.S. PATENT DOCUMENTS

| | | | |
|---|---|---|---|
| 3,085,469 | 4/1963 | Carlson | 350/393 |
| 3,517,983 | 6/1970 | Fein et al. | 350/354 |
| 3,707,323 | 12/1972 | Kessler et al. | 350/358 |
| 4,379,408 | 4/1983 | Sandhu | 350/330 |
| 4,403,834 | 9/1983 | Kley | 350/330 |

OTHER PUBLICATIONS

Mailer et al., "Effect of Ultrasound on a Nematic Liquid Crystal", App. Phys. Letts. 2-15-71, pp. 105–107.
Martinoty et al., "Pulse Acousto-Optic Modulator Using a Nematic Liquid Crystal in its Isotropic Phase", App. Phys. Letts. 7-1-80, pp. 33–34.
Dion et al., "A New Hypothesis on Ultrasonic Interaction with a Nematic Liquid Crystal", App. Phys. Letts. 10-15-77, pp. 490–493.
Nagai et al., "Acousto-Optical Effects in a Nematic Liquid Crystal", Revue De Physique Appliquee, 1-1977, pp. 21–30.
Stone et al., "A DC-Biased Kerr Cell Light Modulator", App. Optics 4–1966, pp. 653–657.
Fleisher et al., "Radiation Controlled Radiation Gate", IBM Tech. Disc. Bull, 8-1963, pp. 73–74.
Goodman, L. A., "Liquid-Crystal Displays–Packaging & Surface Treatments", Chapt. 12 of Introduction to Liquid Crystals", Edited by Priestly et al., Plenum Press, 1976, pp. 222–230.

Primary Examiner—William H. Punter
Attorney, Agent, or Firm—Hill, Van Santen, Steadman & Simpson

[57] ABSTRACT

There is disclosed herein an orthoscopic ultrasonic imaging system which includes an acoustic transducer for insonifying an object to be inspected and an improved liquid crystal detector cell for receiving an imaging beam from the insonified object and for displaying a visible image.

An acoustic biasing field is applied to the liquid crystal cell for raising the cell to an acousto-optic threshold which permits detection and display of low intensity imaging signals. Using the improved liquid crystal system, low intensity, acoustic fields [e.g. less than $10^{-3}$ w/cm$^2$ (watts per square centimeter)] can be detected and displayed, and the object being examined can be insonified with low intensity ultrasonic beams.

8 Claims, 4 Drawing Figures

ULTRASONIC DETECTOR CELL AND SYSTEM

BACKGROUND OF THE INVENTION

This invention relates to the general field of acoustic imaging, and in particular, to highly sensitive systems and apparatus for detecting and displaying orthoscopic acoustic images.

The use of ultrasonics to nondestructively and noninvasively inspect objects and bodies for internal discontinuities, irregular shapes, etc., is well known in both the industrial and medical fields. This invention deals with the formation of orthoscopic or two dimensional images on a liquid crystal cell rather than the formation of holographic or three dimensional images.

In one form, ultrasonic imaging is accomplished by using electronic displays in which the ultrasonic signal is electronically detected (by a piezoelectric detector array) and enhanced. Green, P. S., Schaefer, L. F., Jones, E. D., Suarez, J. R., A New Performance Ultrasonic Camera, in Acoustical Holography, Vol. 5, Ed. Green, P. S., Plenum Press, New York 1974, 493-503.

In another form, the ultrasonic image is proposed to be detected and displayed using a liquid crystal cell which includes a pair of cover plates between which a layer of liquid crystal material is encapsulated. See, for example, Greguss, U.S. Pat. No. 3,831,434; and Dion, U.S. Pat. No. 4,338,821. The performance of liquid crystal cells may be enhanced by treating the liquid-crystal-contacting surfaces of the cell with a surfactant, such as lecithin. It is also known that liquid crystal materials will respond to externally applied force fields. See, for example, Greguss; Dion; Tsunoda et al., U.S. Pat. No. 4,035,060; Mailer, U.S. Pat No. 3,837,423; and "New Techniques of Acoustic Image Detection," Mailer et al., International Journal of Non-Destructive Testing, 1973, Vol. 4, pp. 283-299. Introduction to Liquid Crystals Ed. E. B. Priestly, Peter J. Wojtowicz, Ping Sheng. Plenum Press June 1976.

Liquid crystal detector cells may be preferred to fully electronic detection and display systems, since liquid crystal cells can be less expensive to manufacture and maintain than fully electronic systems and can provide substantially instantaneous well-resolved images without the need for electronic image enhancement, through complicated signal processing, or adjustment.

The use of ultrasonics in medical applications, is increasing, and in such applications, it is particularly desirable that the intensity of the insonifying ultrasonic field (i.e., the beam incident on the patient) be at the lowest possible level. In order to be useful in a wide range of such applications, the liquid crystal cell must be able to detect ultrasonic fields that have passed through or have been reflected from the body or organ to be examined.

In present medical applications the insonifying acoustic field has a maximum intensity on the order of $100 \times 10^{-3}$ w/cm$^2$. It is known that in human tissue there is a loss of ultrasonic intensity of about 3 db per centimeter of tissue penetrated. Thus the intensity of the imaging acoustic field exiting the patient is much less than $10^{-3}$ w/cm$^2$. For example, in order to penetrate a 10 cm thick tissue, there would be a loss of ultrasonic intensity of 30 db. Therefore, if the incident intensity is $100 \times 10^{-3}$ w/cm$^2$ the exiting intensity will be about $100 \times 10^{-6}$ w/cm$^2$. Present orthoscopic imaging systems using liquid crystal cells can not detect a field and display an image where the incident acoustic intensity is much less than $10^{-3}$ w/cm$^2$.

Thus prior liquid crystal detecting cells are not capable of detecting and displaying an image from the low acoustic intensity beams that exit an examined object.

It is therefore an object of this invention to provide a liquid crystal-type detector cell for use in an orthoscopic ultrasonic inspection system, of the type used in medical diagnosis, which can detect low intensity acoustic fields.

It is another object of this invention to provide an orthoscopic liquid crystal-type ultrasonic inspection system which is capable of detecting and displaying ultrasonic fields having intensities less than about $10^{-3}$ w/cm$^2$.

These and other objects of this invention will become apparent from the following description and appended claims.

SUMMARY OF THE INVENTION

There is provided by this invention a liquid crystal-type ultrasonic inspection system which can detect and orthoscopically display low intensity acoustic fields. The device is useful in medical applications and can detect acoustic fields where the intensity of the beam incident on the cell, is less than about $10^{-3}$ w/cm$^2$.

In this system there is provided a liquid crystal detector cell in which the liquid crystal material is subjected to an acoustic biasing field, which raises the cell to an acousto-optic threshold (i.e. a point at which the onset of an acousto-optic effect is observed).

Details of the cells and their operation are discussed hereinafter.

DESCRIPTION OF THE PREFERRED EMBODIMENT

In General

Figure 1:
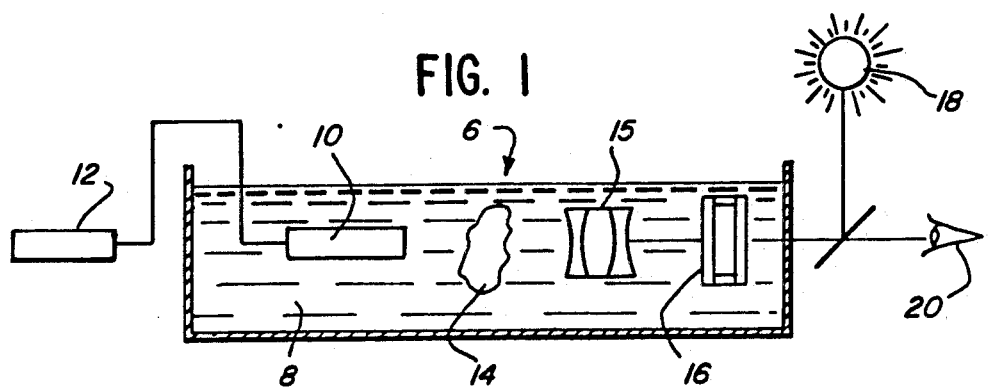
FIG. 1 is a diagrammatic view showing a typical ultrasonic imaging system which employs a liquid crystal display.

In referring now to FIG. 1, the numeral 6 indicates generally a simple form of an ultrasonic imaging system, which uses a liquid crystal detector cell. The system includes a bath 8, usually water, and an acoustic transducer 10 that is driven by a power supply 12. Transducer 10 directs an ultrasonic or acoustic beam toward the body or object 14, which is to be inspected, so as to insonify the body. Typically, the body is to be examined for an internal defect or feature which could not be otherwise viewed.

In the transmission mode, an image-carrying ultrasonic beam exits the body 14 with information concerning the internal structure, and that beam may be focused with an acoustic lens system 15, on to the liquid crystal detector cell 16 so as to form an acoustic image. The interaction of the acoustic imaging beam with the liquid crystal material produces an image of the interior of the inspected body. The images produced on the cell are orthoscopic or two dimensional rather than holographic or three dimensional.

In order to assure proper viewing, the cell 16 is illuminated using an optical system, such as 18, which includes a light source, half-silvered mirror, appropriate lenses and crossed-polarizers (not herein specifically shown) which enables the viewer 20 to see the image of the inspected body 14. The transducer 10, object 14 and cell 16 are acoustically coupled to each other by the water bath 8; however, other coupling media may be used and contact coupling rather than immersion may be employed. Furthermore, while only the acoustic transmission mode is shown, the system can also be used in an acoustic reflection mode to receive signals reflected from the interior of a body. The choice of transmission or reflection depends upon the specific situation. The cells disclosed herein can be used in either the transmission or reflective modes.

Figure 2:
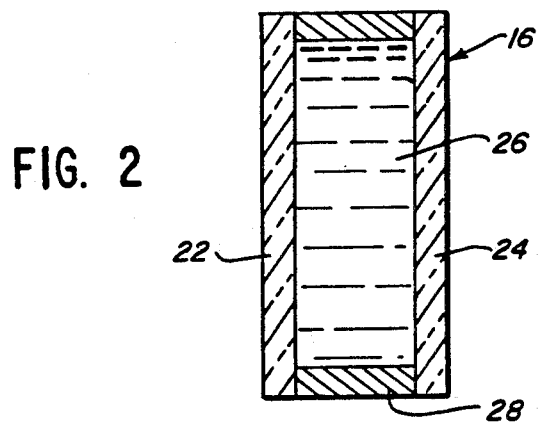
FIG. 2 is a diagrammatic view showing a typical liquid crystal cell in cross-section.

As seen in FIG. 2, a simple liquid crystal cell 16 includes a pair of substantially acoustically transparent cover members or substrates 22 and 24, at least one of which is also optically transparent. A thin layer of liquid crystal material 26 is encapsulated between the cover members, by the peripheral seal or spacer 28. Many different liquid crystal materials can be used, and the specific material will depend upon the particular use to which the cell will be put. However, liquid crystal materials, such as nematic, twisted nematic, nematic/cholesteric mixtures, guest-host or smectics can be used.

In the cell 16 the cover member 24 forms the optically transparent side or viewing side, and the other cover 22 forms the imaging-beam receiving side.

Sandhu, U.S. Pat. No. 4,379,408 discloses a liquid crystal cell and ultrasonic inspection system of the type described and by reference thereto the disclosure of Sandhu is incorporated herein.

Figure 3:
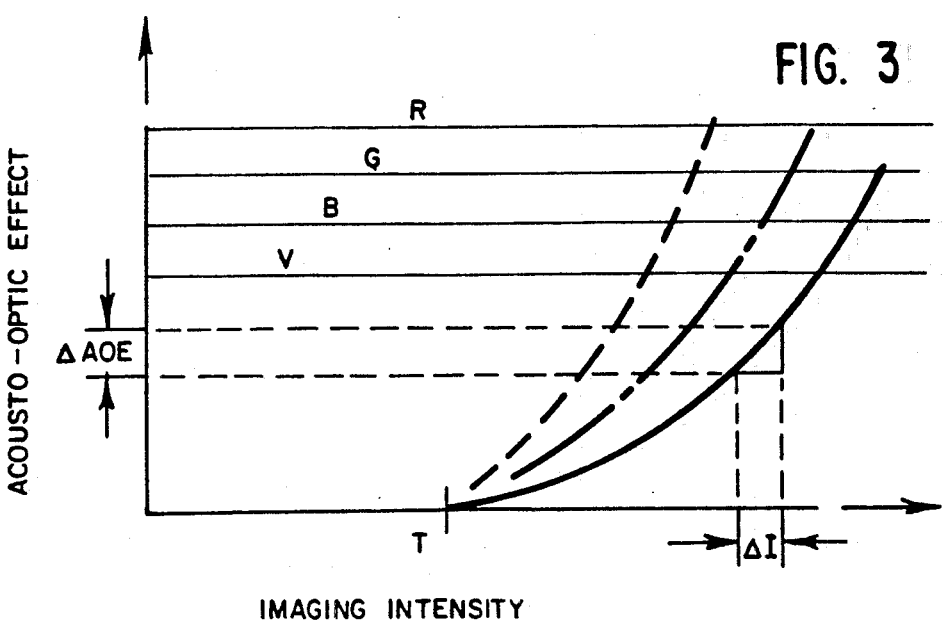
FIG. 3 is an idealized graphic representation of the relationship between acousto-optic effect (e.g., optical transmission) and acoustic intensity and also shows the threshold (T)

An image is produced in a liquid crystal cell by the interaction of the acoustic imaging beam with the liquid crystal material. FIG. 3 shows in idealized fashion the relationship between the acousto-optic effect (for example, light transmission between crossed polarizers) and the intensity of the ultrasonic or acoustic beam incident on the cell. It is seen that little, if any, acousto-optic effect is produced when the intensity of the incident beam is below the threshold (T). When the acoustic intensity exceeds the threshold (T), the imaging or acousto-optic effect is initiated and increases with increasing acoustic intensity. Furthermore, as intensity increases, along the curve, the acousto-optic effect shows a gray-scale range or response followed by a range of colors, such as violet (V), blue (B), green (G) and red (R).

The sensitivity of the cell is related to the change in acousto-optic effect as a function of imaging intensity (i.e., the slope of the curve shown in FIG. 3). A steep curve represents greater sensitivity as there is a greater change ($\Delta$AOE) in the acousto-optic effect, or ordinate, for a given change in the intensity ($\Delta$I) or abscissa. The sensitivity of the cell can be increased as indicated by the dotted and dashed curves by operating the liquid crystal cell below but in the vicinity of the nematic/isotropic transition temperature, which for many materials can be just above the the operating temperature. Changes in material composition such as by using mixtures of different nematic materials can affect the nematic/isotropic temperature. Changes in the thickness of the liquid crystal layer will affect sensitivity, with the cell becoming more sensitive as thickness increases.

In prior orthoscopic liquid crystal imaging systems the acoustic energy necessary to reach the threshold (T) was a component of the insonifying beam, thus requiring a high intensity beam to insonify the test body. However, it has been determined that energy can be applied to the cell in two components. One component can be considered as a biasing field which raises the cell to the threshold level (T) and the other component is the imaging beam which raises the cell beyond the threshold and causes the image to be displayed. It has been determined that the biasing field may be acoustic. The specific use of acoustic biasing fields and related considerations are discussed hereinafter.

It should be noted that in the prior unbiased orthoscopic liquid crystal systems, the intensity of the insonifying beam needed to assure a detectable imaging beam, may be too great for medical applications; whereas with appropriate biasing as described herein the insonifying beam may be of a much lower and acceptable intensity and the resulting low intensity imaging beam can be detected and the image displayed.

It is also known that at the substrate/liquid crystal interface, surface forces control the alignment of the molecules adjacent the surface, which molecules in turn align neighboring molecules. However, as the liquid crystal layer is made thicker, this bulk effect is less pronounced, or in other words, the surface forces are weakened in the bulk. In addition, liquid crystal materials exhibit elasticity or elastic properties. The surface force and elastic force contribute to the magnitude of the acousto-optic threshold (T). The liquid crystal layers used herein are in the range of 5 to 200 micrometers thick, although thickness of about 500 micrometers has also been used.

Acoustic Biasing

Figure 4:
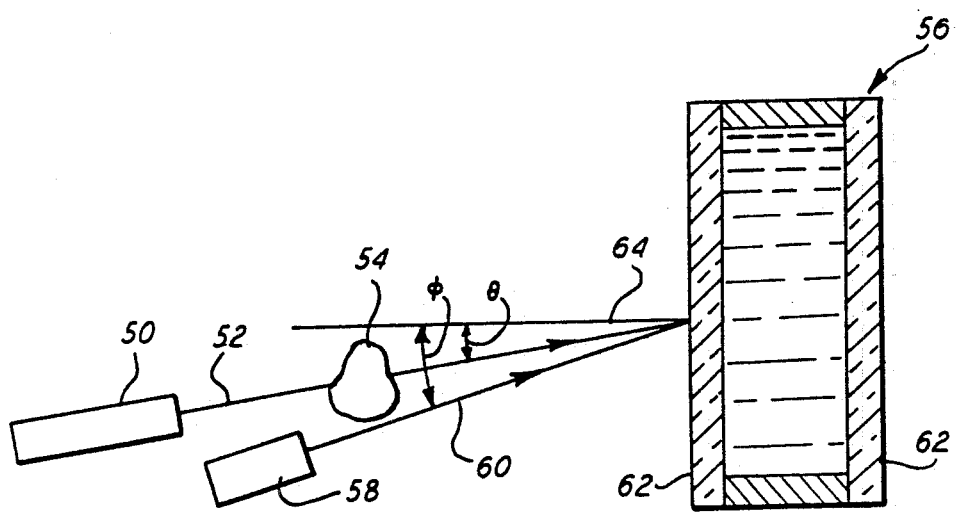
FIG. 4 is a diagrammatic view showing an apparatus for acoustic biasing and showing various angular relationships.

Referring now to FIG. 4, an acoustic biasing system is shown diagrammatically. In that system the insonifying or imaging transducer 50 directs the insonifying beam 52 to the object 54 and in the transmission mode the imaging beam exits the object 54 and is incident on a detector cell shown generally as 56. A second ultrasonic transducer 58 provides the biasing acoustic field 60.

The imaging beam 52 and biasing beam 60 contact cell 56 as shown. The imaging beam 52 is preferably at an angle theta ($\theta$) to the normal and the biasing beam 60 is at an angle phi ($\phi$) to the normal. The angles of the imaging and biasing beam are selected so as to maximize transmission and minimize the internal reflection. Transmission through liquid crystal cell cover 62 is dependent in part on the angle of incidence of the beam to each cell cover 62. For example, in glass, it is known that small angular variations of $\pm 10°$ from normal do not have an appreciable adverse effect on transmission if the substrate thickness is approximately $\lambda/2$. Other materials may have different thickness.

It is also to be noted that the biasing beam is positioned on the same side of the normal 64 as is the imaging beam 52 so that both beams operate to rotate the liquid crystal molecules in the same direction. The biasing beam 60 raises the cell to the threshold and the imaging beam 52 raises the cell into the image forming region.

Furthermore, it is desirable that the imaging beam and biasing beam not be coherent. This minimizes potential interference between the imaging beam and the biasing beam. This lack of coherency can be produced by techniques such as frequency sweeping.

In the acoustic biasing system it is desirable that the nematic material be homeotropically aligned, and if necessary, lecithin or another surfactant may be used.

In the acoustic system the biasing field beam can have an intensity of between $1-10 \times 10^{-3}$ w/cm$^2$ and the imaging beam may have an intensity of about $10^{-5}$ w/cm$^2$.

Effect of the Nematic/Isotropic Temperature

In the previous description the cell was operated at room temperature, about 18 degrees C. The nematic-/isotropic (N/I) temperature for K15 (4-cyano-4'n-pentyl-biphenyl) is about 35 degrees C. When the operating temperature is raised to just below N/I, for example to 33° C., then the sensitivity is raised to about $10^{-7}$ w/cm$^2$.

It will be appreciated that numerous changes and modifications can be made to the device disclosed herein without departing from the spirit and scope of this invention.

What is claimed is:

1. A liquid crystal cell for use in an orthoscopic ultrasonic imaging system for detecting an acoustic imaging beam and for displaying an image, said cell including a pair of cover members, each of which is substantially acoustically transparent and at least one of which is optically transparent; a layer of liquid crystal material disposed between said cover members; peripheral spacer means disposed between said cover members for sealingly engaging said cover members and encapsulating said liquid crystal material therebetween; said cell having an imaging beam receiving side, and said cell being characterized by an acousto-optic threshold,
    wherein the improvement comprises there being further provided:
    acoustic biasing beam means for applying an acoustic field, which is not coherent with the imaging field, to said imaging-beam receiving side of said cell to raise said cell to said threshold so that said cell will display an image when excited by a low intensity acoustic imaging beam.

2. A cell as in claim 1, wherein said cell is substantially acoustically transparent in an angular range about a line normal to the surface of said cover members and wherein said imaging beam is incident on said cell at a first angle within said range and said biasing beam is incident on said cell at a second angle within said range.

3. A cell as in claim 1, wherein said cell is characterized by detecting and displaying imaging beams incident thereon having an intensity less than about $10^{-3}$ w/cm$^2$.

4. A cell as in claim 3 wherein said cell is characterized by detecting and displaying imaging beams incident thereon having an intensity of about $10^{-7}$ w/cm$^2$.

5. A cell as in claim 1 wherein the nematic/isotropic transformation temperature of the liquid crystal material is near but above the operating temperature of the cell.

6. A cell as in claim 2, wherein said first angle of incidence for said imaging beam is less than said second angle of incidence for said biasing beam.

7. A cell as in claim 6, wherein said biasing beam is imaging beam is positioned on a side of the line normal to the surface of said cover members and said biasing beam is positioned on the same side of said normal line.

8. An ultrasonic imaging system for non-destructively and non-invasively inspecting an object and displaying an image thereof, said system including:
    an ultrasonic source for insonifying said object with acoustic energy; liquid crystal cell display means for detecting the imaging acoustic field exiting from said insonified object and for displaying an orthoscopic image of said signals; said cell including a pair of substantially acoustically transparent cover members, a layer of liquid crystal material disposed therebetween, and peripheral spacer means disposed between said cover members, sealingly engaging said cover members and encapsulating said liquid crystal material therebetween, said cell being characterized by an acousto-optic threshold; and said cell having an imaging beam receiving side and a viewing side;
    optical means for illuminating said cell and for viewing images displayed thereon; and means for acoustically coupling said ultrasonic source, object and cell means;
    wherein the improvement comprises there being further provided:
    acoustic biasing beam means for applying an acoustic field, which is not coherent with the imaging field, to the imaging beam receiving side of said cell so as to raise said cell to said threshold so that a low intensity acoustic imaging beam incident on said cell will raise said cell above said threshold and form an image.

* * * * *